Figure 1:
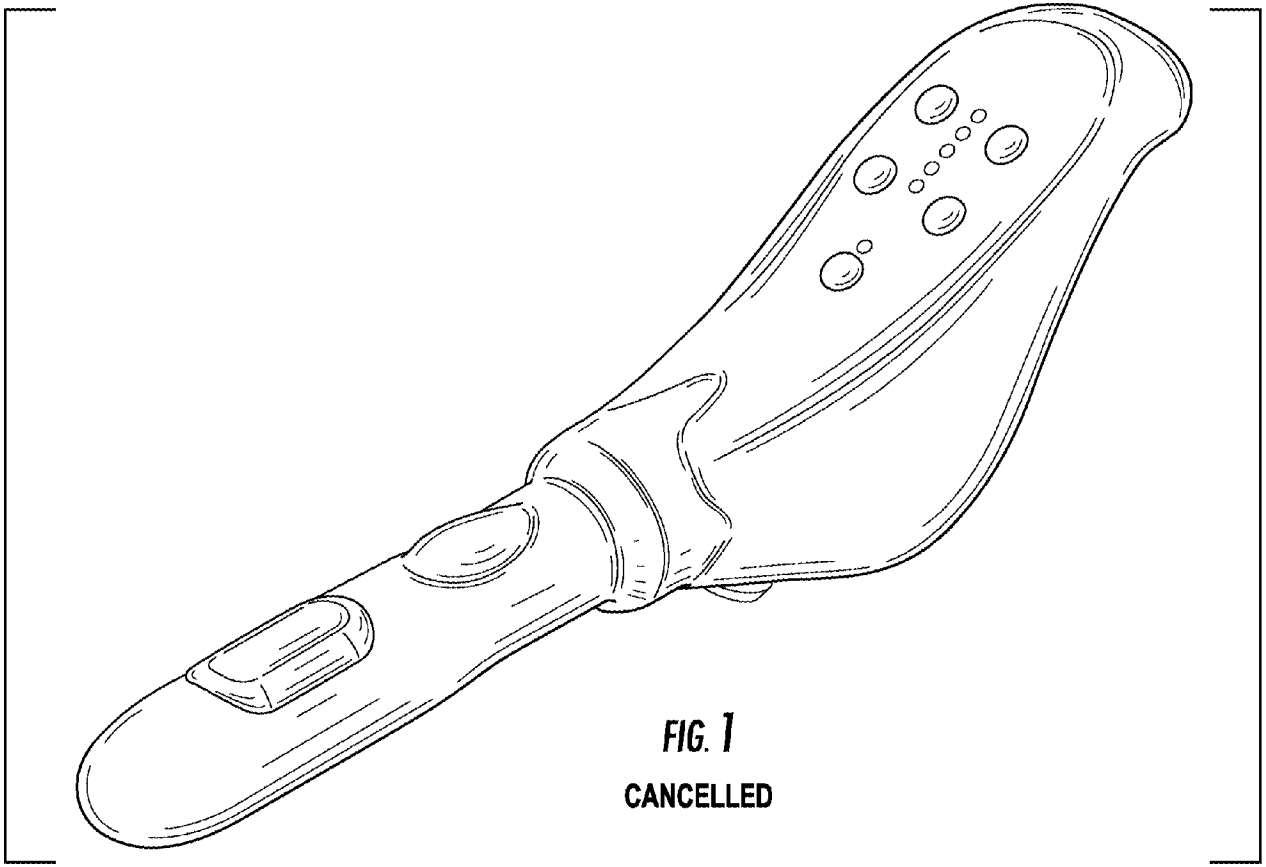

US00RE46163E

(19) United States
(12) Reissued Patent
Peddicord

(10) Patent Number: US RE46,163 E
(45) Date of Reissued Patent: Sep. 27, 2016

(54) STIMULATION DEVICE

(71) Applicant: INCONTROL MEDICAL, LLC, Brookfield, WI (US)

(72) Inventor: Herschel Peddicord, Longboat Key, FL (US)

(73) Assignee: InControl Medical, LLC, Brookfield, WI (US)

(21) Appl. No.: 29/529,605

(22) Filed: Jun. 9, 2015

Related U.S. Patent Documents

Reissue of:
(64) Patent No.: Des. 674,503
Issued: Jan. 15, 2013
Appl. No.: 29/426,577
Filed: Jul. 6, 2012

U.S. Applications:
(60) Division of application No. 29/484,554, filed on Mar. 11, 2014, now Pat. No. Re. 45,585, which is an application for the reissue of Pat. No. Des. 674,503, which is a division of application No. 29/394,434, filed on Jun. 16, 2011, now Pat. No. Des. 670,398, which is a continuation-in-part of application No. 29/382,734, filed on Jan. 6, 2011, now Pat. No. Des. 652,526.

(51) LOC (10) Cl. ..... 28-03
(52) U.S. Cl.
USPC ..... D24/215
(58) Field of Classification Search
USPC ..... D24/211–215, 141
CPC .. A61H 19/34; A61H 19/44; A61H 23/0263; A61H 23/0254; A61H 2205/087
See application file for complete search history.

(56) References Cited

U.S. PATENT DOCUMENTS

| | | | | |
|---|---|---|---|---|
| 3,403,684 | A | | 10/1968 | Steibel et al. |
| 3,800,800 | A | | 4/1974 | Garbe et al. |
| D320,087 | S | | 9/1991 | Sholzberg et al. |
| 5,199,443 | A | | 4/1993 | Maurer et al. |
| 5,314,465 | A | | 5/1994 | Maurer et al. |
| 5,370,671 | A | | 12/1994 | Maurer et al. |
| 5,376,064 | A | | 12/1994 | Cerny |
| 5,385,577 | A | | 1/1995 | Maurer et al. |
| D384,156 | S | * | 9/1997 | Kain ..... D24/200 |
| 5,662,699 | A | | 9/1997 | Hamedi et al. |
| 5,800,501 | A | | 9/1998 | Sherlock |
| 5,875,778 | A | | 3/1999 | Vroegop |
| 5,881,731 | A | | 3/1999 | Remes |
| 6,190,307 | B1 | | 2/2001 | Tsai |
| 6,289,894 | B1 | | 9/2001 | Remes |
| 6,625,495 | B1 | | 9/2003 | Alon et al. |
| 6,741,895 | B1 | | 5/2004 | Gafni et al. |
| 6,905,471 | B2 | | 6/2005 | Leivseth et al. |
| D536,097 | S | | 1/2007 | Nan |
| D536,797 | S | | 2/2007 | Klearman et al. |
| D546,964 | S | | 7/2007 | Wu |
| D555,798 | S | | 11/2007 | Nan |
| D555,799 | S | | 11/2007 | Nan |
| D558,356 | S | | 12/2007 | Nan |
| 7,341,566 | B2 | | 3/2008 | Nan |
| D579,573 | S | | 10/2008 | Nan |
| 7,438,681 | B2 | | 10/2008 | Kobashikawa et al. |
| D585,560 | S | | 1/2009 | Wu |
| D592,758 | S | | 5/2009 | Kain |
| 7,534,203 | B2 | | 5/2009 | Gil |
| 7,577,476 | B2 | | 8/2009 | Hochman et al. |
| D603,523 | S | | 11/2009 | Nan et al. |
| D606,206 | S | | 12/2009 | Nan et al. |
| D606,207 | S | | 12/2009 | Nan et al. |
| D606,208 | S | | 12/2009 | Nan et al. |
| D615,663 | S | | 5/2010 | Nan |
| D643,128 | S | * | 8/2011 | Mohamed ..... D24/215 |
| D648,442 | S | * | 11/2011 | Caggiano ..... D24/215 |
| D653,350 | S | | 1/2012 | Chen |
| 8,509,900 | B2 | | 8/2013 | Boyd et al. |
| 2004/0054392 | A1 | | 3/2004 | Dijkman |
| 2007/0149903 | A1 | | 6/2007 | Nan |
| 2008/0009775 | A1 | | 1/2008 | Murison |
| 2008/0119767 | A1 | | 5/2008 | Berry et al. |
| 2009/0005714 | A1 | | 1/2009 | Mecenero |
| 2009/0171144 | A1 | | 7/2009 | Squicciarini |

| | | | |
|---|---|---|---|
| 2009/0228064 | A1 | 9/2009 | Boyd et al. |
| 2009/0270963 | A1 | 10/2009 | Pelger et al. |
| 2009/0275796 | A1 | 11/2009 | Gil |
| 2010/0004707 | A1 | 1/2010 | Hochman et al. |
| 2010/0041944 | A1 | 2/2010 | Levy |
| 2010/0087703 | A1 | 4/2010 | Gabrielidis |
| 2010/0106216 | A1 | 4/2010 | Cha et al. |
| 2010/0174136 | A1 | 7/2010 | Shim |
| 2010/0174137 | A1 | 7/2010 | Shim |
| 2011/0034834 | A1 | 2/2011 | Lapi |
| 2011/0034837 | A1 | 2/2011 | Lee |
| 2011/0105837 | A1 | 5/2011 | Lee |
| 2011/0230802 | A1 | 9/2011 | Nan |
| 2014/0200646 | A1 | 7/2014 | Boyd et al. |

OTHER PUBLICATIONS

Notice of Allowance for U.S. Appl. No. 29/382,734, mailed on Sep. 13, 2011, 10 pages.
Notice of Allowance for U.S. Appl. No. 29/394,433, mailed on Jun. 7, 2012, 13 pages.
Notice of Allowance for U.S. Appl. No. 29/394,434, mailed on Jun. 19, 2012, 13 pages.
Notice of Allowance for U.S. Appl. No. 29/414,097, mailed on Jun. 22, 2012, 13 pages.

* cited by examiner

*Primary Examiner* — Phillip S Hyder
(74) *Attorney, Agent, or Firm* — Foley & Lardner LLP

(57) CLAIM

I claim the ornamental design for a stimulation device, as shown and described.

DESCRIPTION

Figure 2:
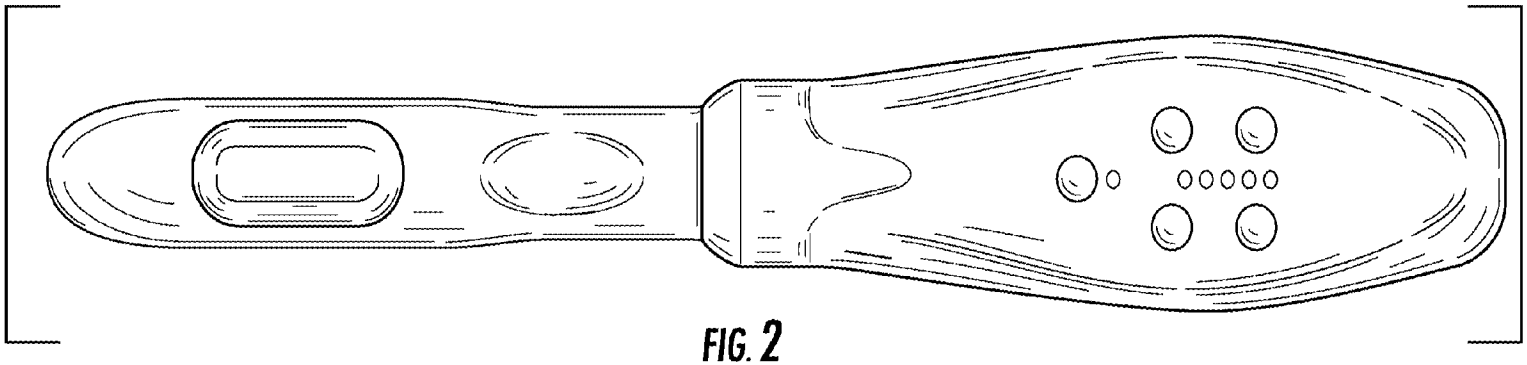
Figure 3:
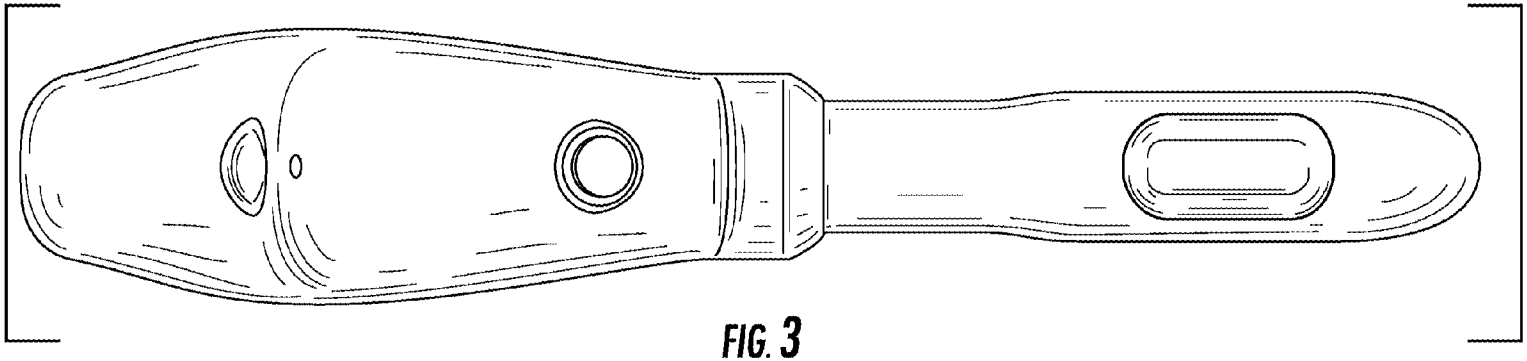
Figure 4:
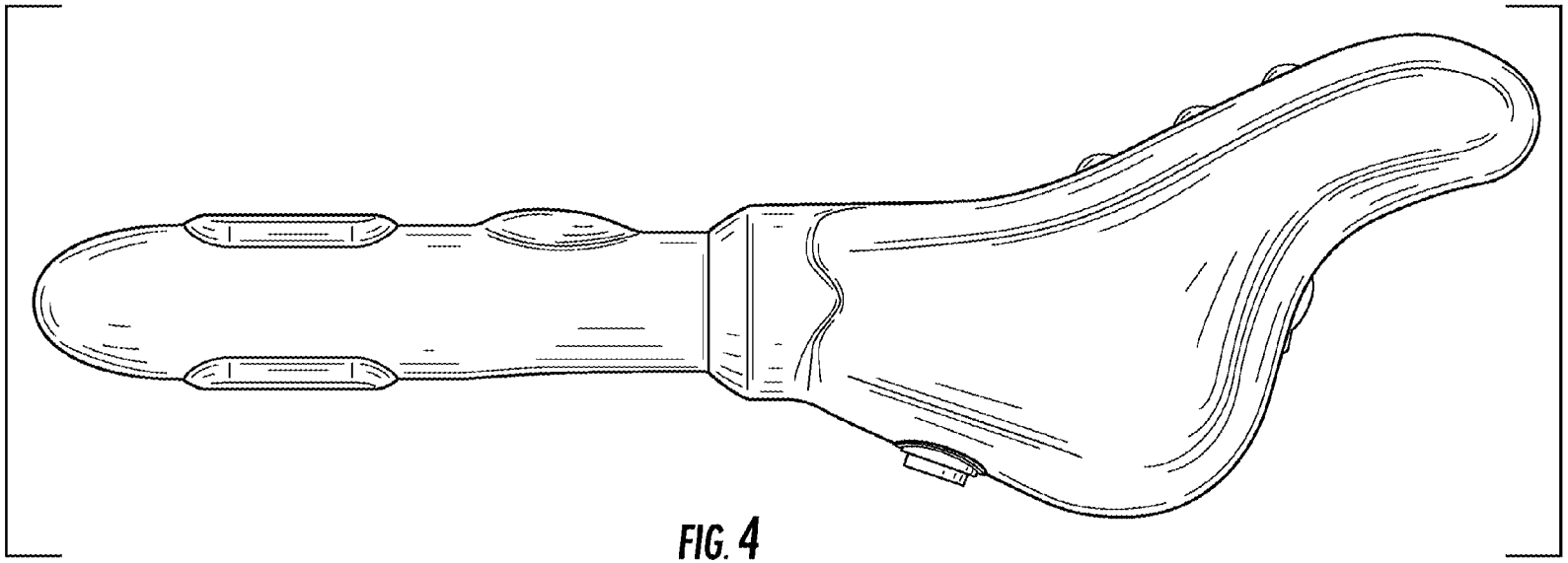
Figure 5:
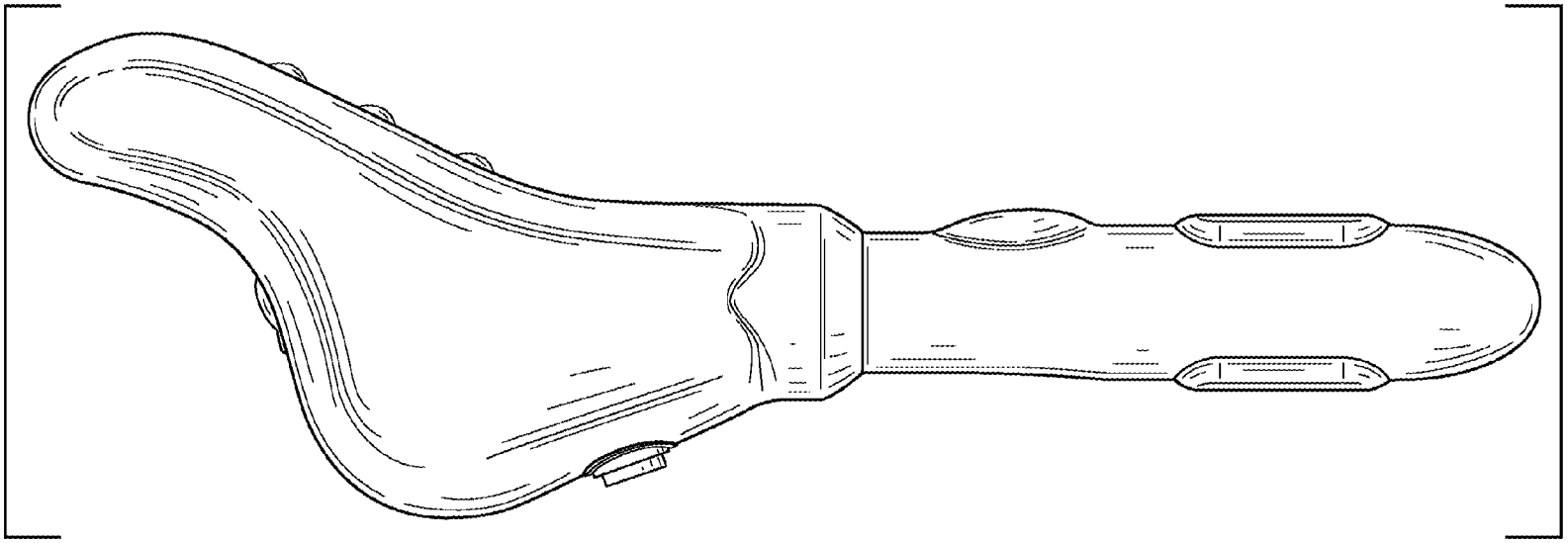
Figure 6:
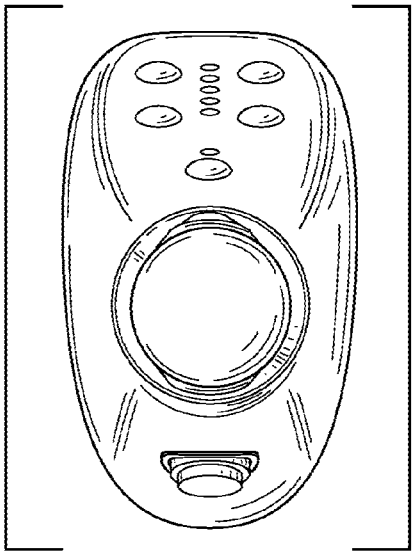
Figure 7:
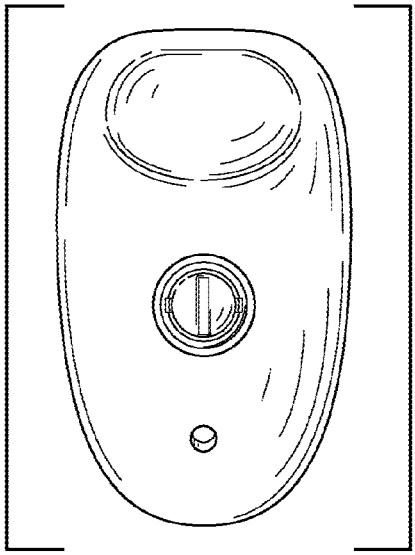
Figure 8:
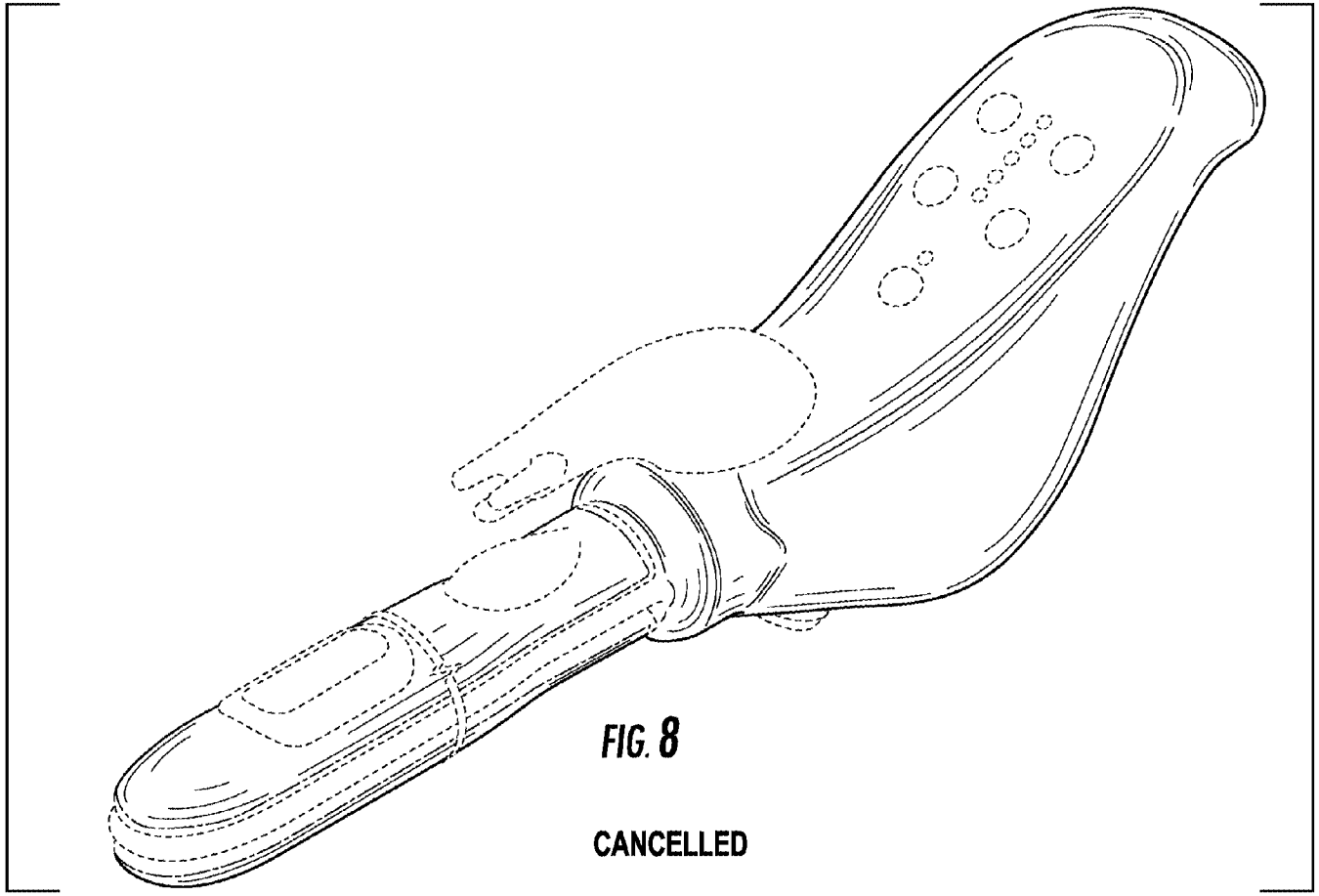
Figure 9:
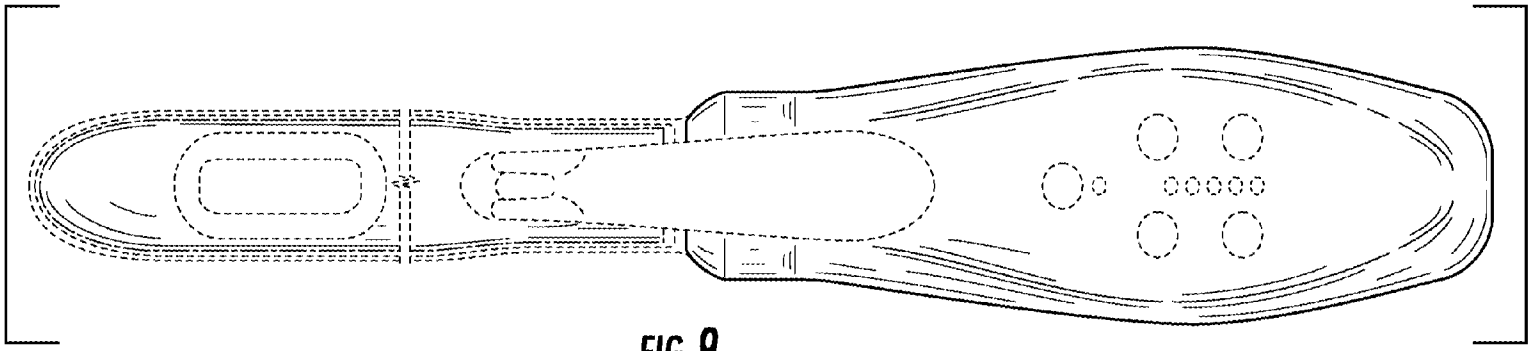
Figure 10:
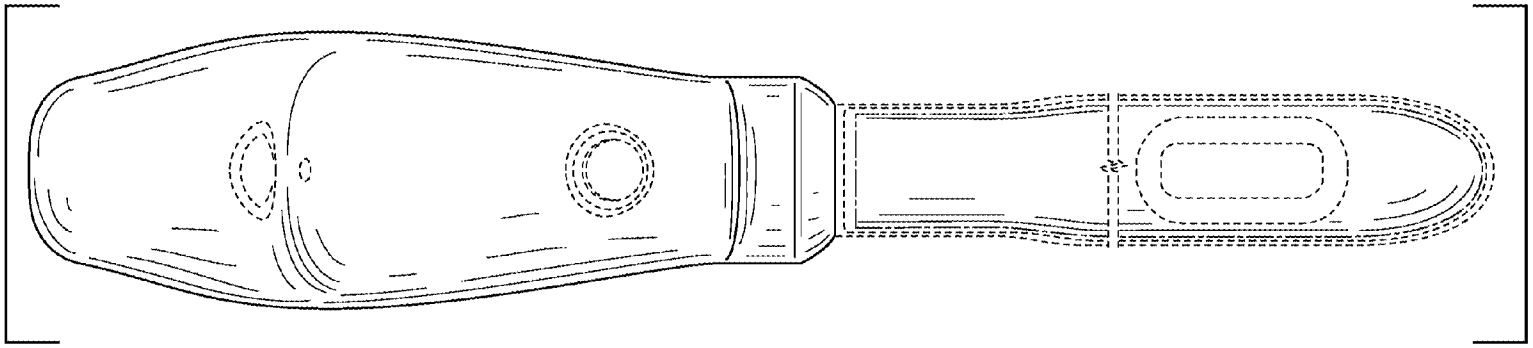
Figure 11:
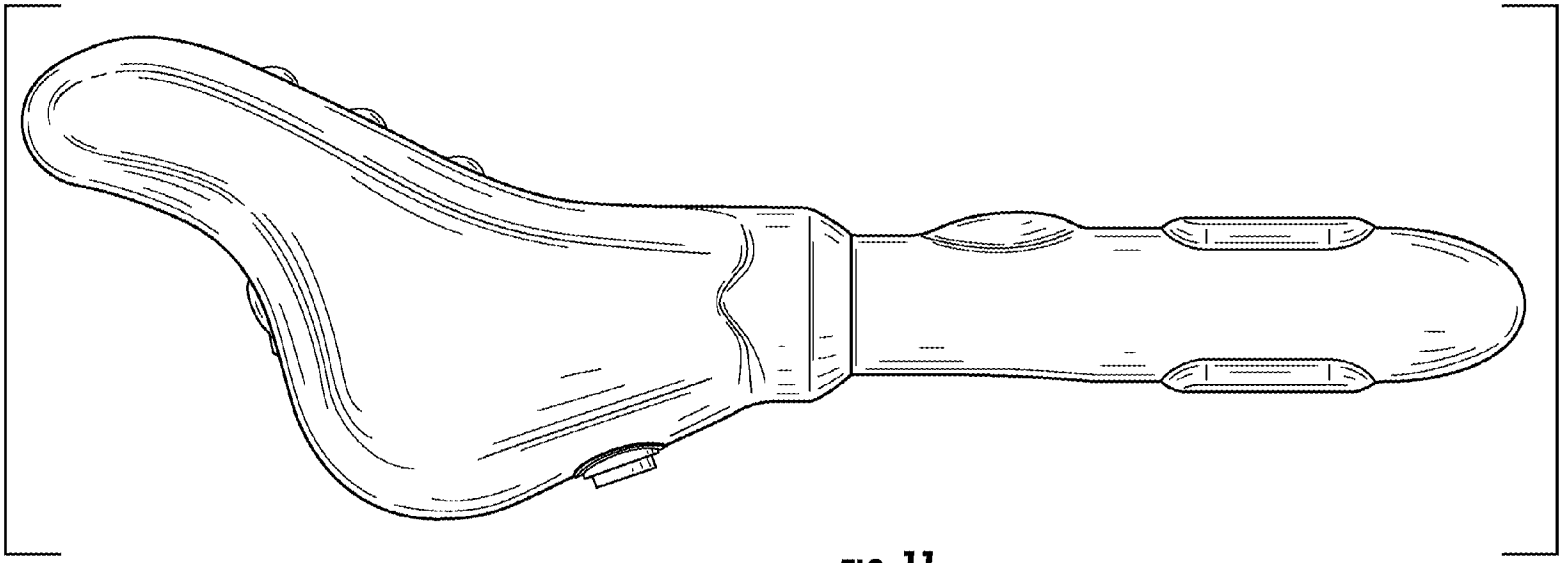
Figure 12:
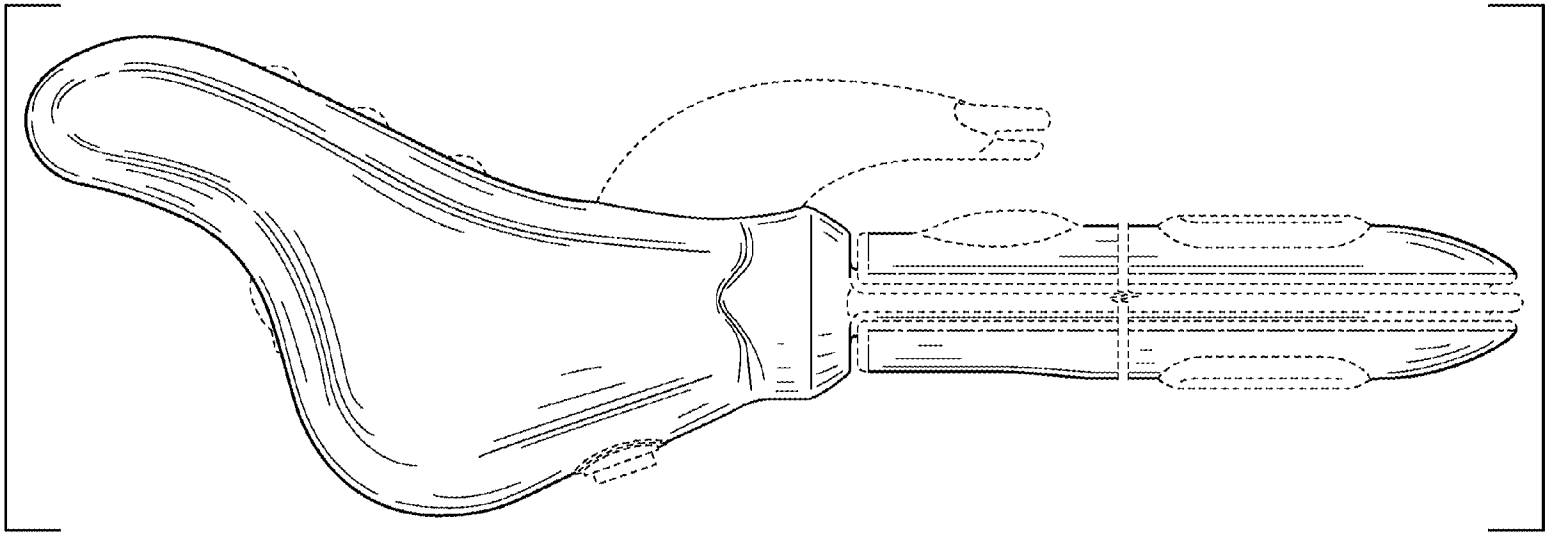
Figure 13:
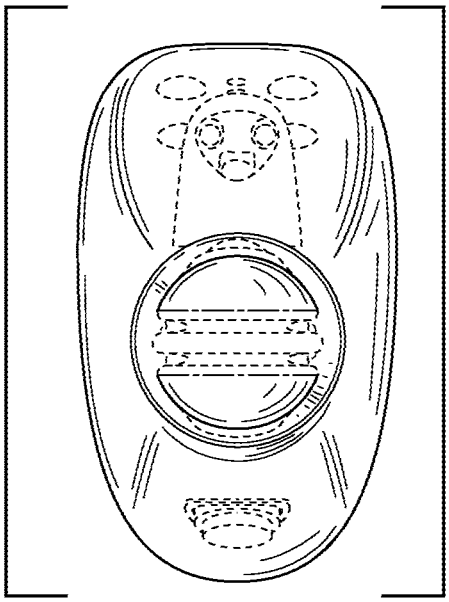
Figure 14:
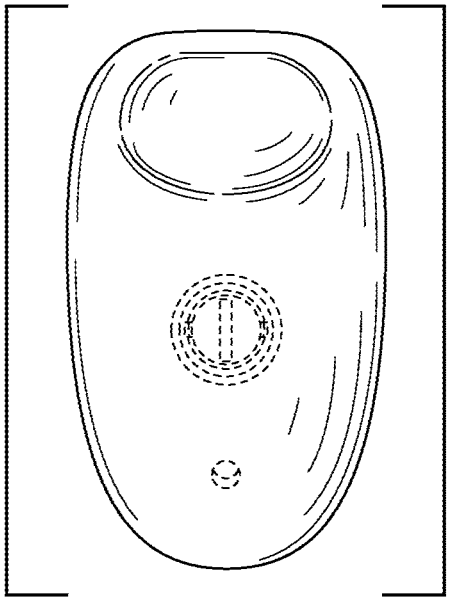

[FIG. 1 is a perspective view of an embodiment of the claimed design;]
[FIG. 2 is a top view of the claimed design of FIG. 1;]
[FIG. 3 is a bottom view of the claimed design of FIG. 1;]
[FIG. 4 is a right side view of the claimed design of FIG. 1;]
[FIG. 5 is a left side view of the claimed design of FIG. 1;]
[FIG. 6 is a front view of the claimed design of FIG. 1;]
[FIG. 7 is a rear view of the claimed design of FIG. 1;]
[FIG. 8 is a perspective view of an embodiment of the claimed design;]
[FIG. 9 is a top view of the claimed design of FIG. 8;]
[FIG. 10 is a bottom view of the claimed design of FIG. 8;]
[FIG. 11 is a right side view of the claimed design of FIG. 8;]
[FIG. 12 is a left side view of the claimed design of FIG. 8;]
[FIG. 13 is a front view of the claimed design of FIG. 8; and,]
[FIG. 14 is a rear view of the claimed design of FIG. 8.]

*Notice: More than one reissue application has been filed for the reissue of U.S. Pat. No. D674,503. The present application is a reissue of U.S. Pat. No. D674,503, and is a divisional reissue of U.S. patent application Ser. No. 29/484,554, filed on Mar. 11, 2014, now U.S. Reissued Pat. No. RE45585, which is also a reissue of U.S. Pat. No. D674,503, which is a divisional of U.S. patent application Ser. No. 29/394,434, filed on Jun. 16, 2011, now U.S. Pat. No. D670,398, which is a continuation-in-part of U.S. patent application No. 29/382,734, filed on Jan. 6, 2011, now U.S. Pat. No. D652,526, each of which are incorporated herein by reference in their entireties and for all purposes.*

*FIG. 15 is a perspective view of an embodiment of the claimed design;*
*FIG. 16 is a top view of the claimed design of FIG. 15;*
*FIG. 17 is a bottom view of the claimed design of FIG. 15;*
*FIG. 18 is a right side view of the claimed design of FIG. 15;*
*FIG. 19 is a left side view of the claimed design of FIG. 15;*
*FIG. 20 is a front view of the claimed design of FIG. 15; and,*
*FIG. 21 is a rear view of the claimed design of FIG. 15.*

The ornamental design which is claimed is shown in solid lines in the drawings. The broken lines in the drawings are for illustrative purposes only and form no part of the claimed design. *Broken lines formed by equal length dashes show unclaimed portions of the design. Broken lines formed by unequal length dashes (i.e., dash-dot) show boundaries between claimed and unclaimed portions of the design.*

1 Claim, 15 Drawing Sheets

Matter enclosed in heavy brackets [ ] appears in the original patent but forms no part of this reissue; matter printed in italics indicates the additions made by reissue.

CANCELLED

CANCELLED

CANCELLED

CANCELLED

CANCELLED

CANCELLED

CANCELLED

CANCELLED

CANCELLED

CANCELLED

CANCELLED

CANCELLED

CANCELLED

CANCELLED

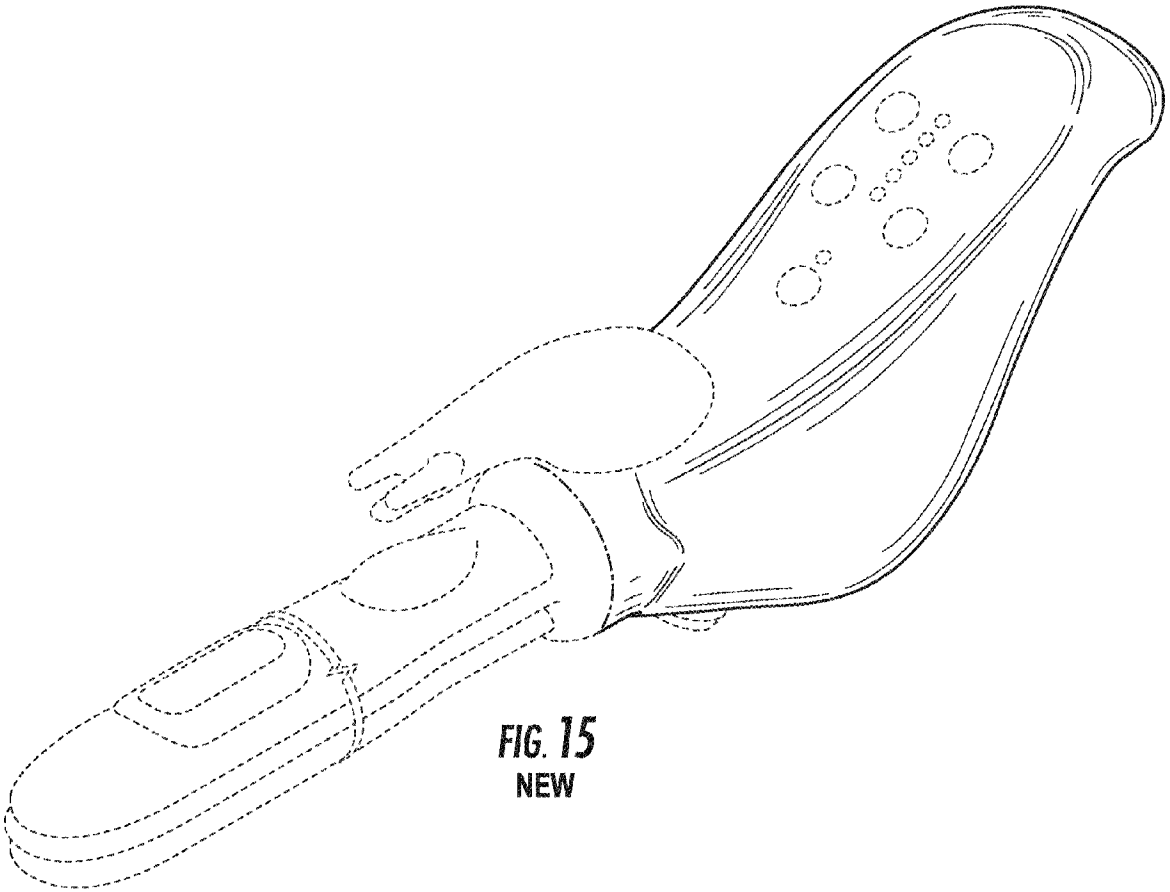
FIG. 15
NEW

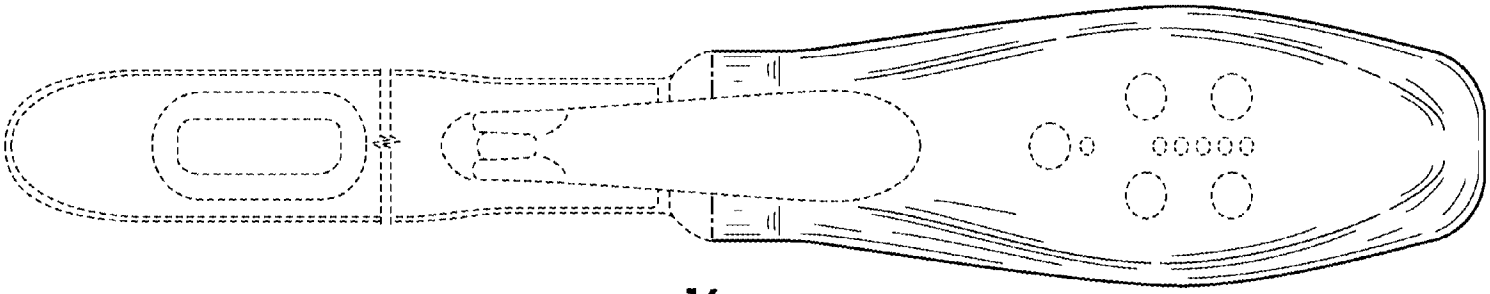
FIG. 16
NEW
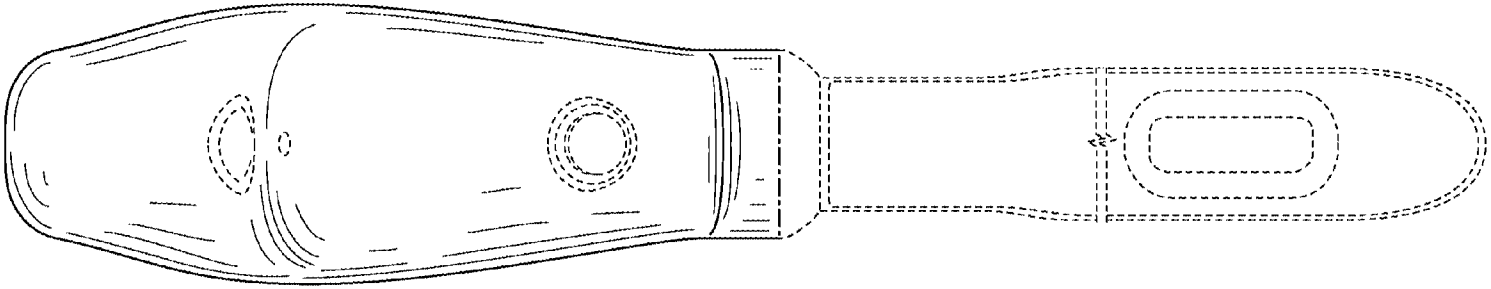
FIG. 17
NEW

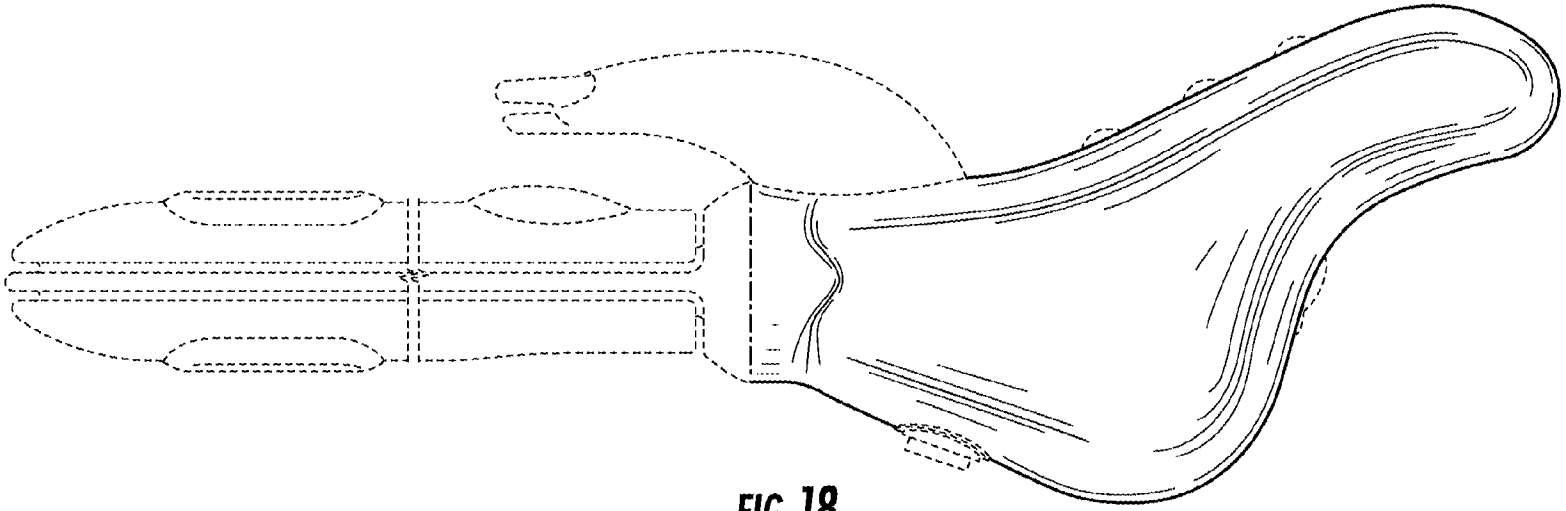
FIG. 18
NEW

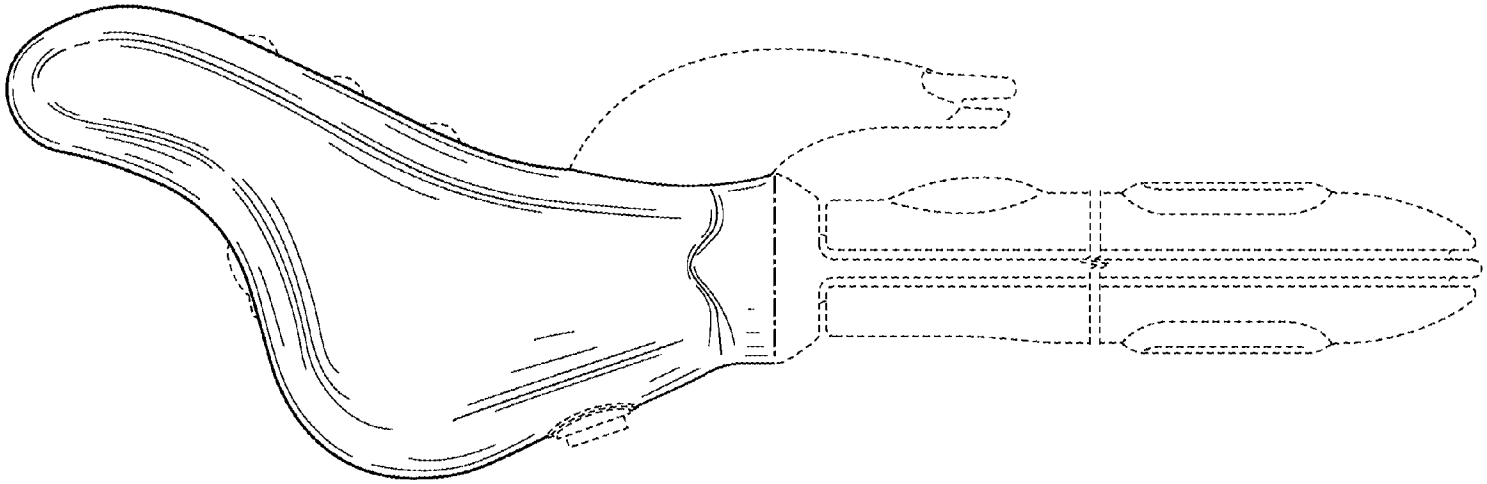
FIG. 19
NEW

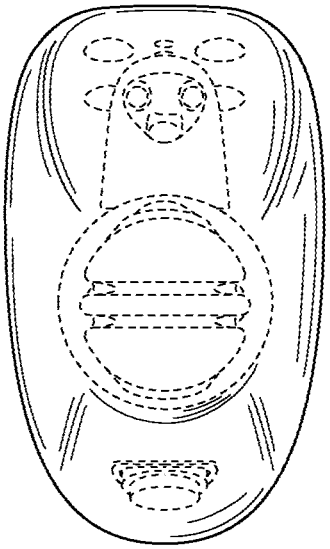
FIG. 20
NEW
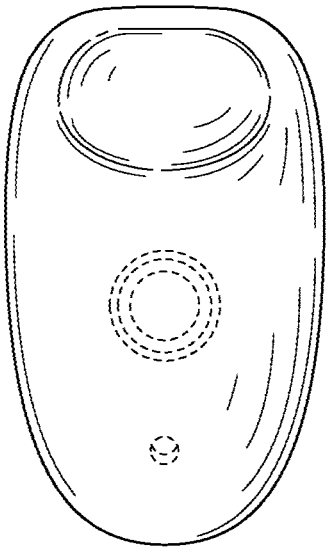
FIG. 21
NEW